US012654738B1

(12) United States Patent
Pasternak

(10) Patent No.:  US 12,654,738 B1
(45) Date of Patent:  Jun. 16, 2026

(54) COMBINING LATENT FEATURES AND NON-LATENT FEATURES BY A PLANNING SYSTEM

(71) Applicant: Zoox, Inc., Foster City, CA (US)

(72) Inventor: Andreas Pasternak, Boulder, CO (US)

(73) Assignee: Zoox, Inc., Foster City, CA (US)

( * ) Notice: Subject to any disclaimer, the term of this patent is extended or adjusted under 35 U.S.C. 154(b) by 71 days.

(21) Appl. No.: 18/889,244

(22) Filed: Sep. 18, 2024

(51) Int. Cl.
*B60W 60/00*    (2020.01)
*G05D 1/43*    (2024.01)

(52) U.S. Cl.
CPC ............. *B60W 60/001* (2020.02); *G05D 1/43* (2024.01)

(58) Field of Classification Search
None
See application file for complete search history.

(56) References Cited

U.S. PATENT DOCUMENTS

| 11,126,179 B2 | 9/2021 | Karasev et al. | |
| 2018/0348775 A1* | 12/2018 | Yu | B60W 30/1882 |
| 2020/0110414 A1* | 4/2020 | Dupre | B60W 60/0015 |
| 2020/0311110 A1* | 10/2020 | Walker | G06F 16/288 |
| 2022/0176995 A1* | 6/2022 | Subramanian | B60W 30/08 |
| 2022/0340169 A1* | 10/2022 | Floor | G01C 21/3407 |
| 2025/0238683 A1* | 7/2025 | Fan | G06N 3/04 |
| 2026/0030547 A1* | 1/2026 | Deetlefs | G06N 3/045 |

OTHER PUBLICATIONS

Schrittwieser, et al.; "Mastering Atari, Go, Chess and Shogi by Planning with a Learned Model" University College of London, Feb. 21, 2020, 21 pages.
U.S. Appl. No. 18/071,489; Schleede, et al. "Vehicle Control Using Auto-Regressive Control Distibution Generation Based On World State Embeddings" filed Nov. 29, 2022.

* cited by examiner

*Primary Examiner* — Daniel L Greene
(74) *Attorney, Agent, or Firm* — Lee & Hayes, P.C.

(57)    ABSTRACT

Techniques for generating a vehicle trajectory usable for for controlling an autonomous vehicle in an environment are described herein. For example, the techniques may include a computing device implementing a machine learned model and a statistical model in parallel in a tree search of a tree structure to predict a trajectory of the autonomous vehicle in the environment. The tree structure can process a latent representation and a non-latent representation in parallel to determine potential actions and/or trajectories for the autonomous vehicle. The tree structure of the computing device can output a trajectory for controlling the autonomous vehicle in the environment. Depending on examples, the environment is a real-world environment or a simulated environment.

20 Claims, 6 Drawing Sheets

100

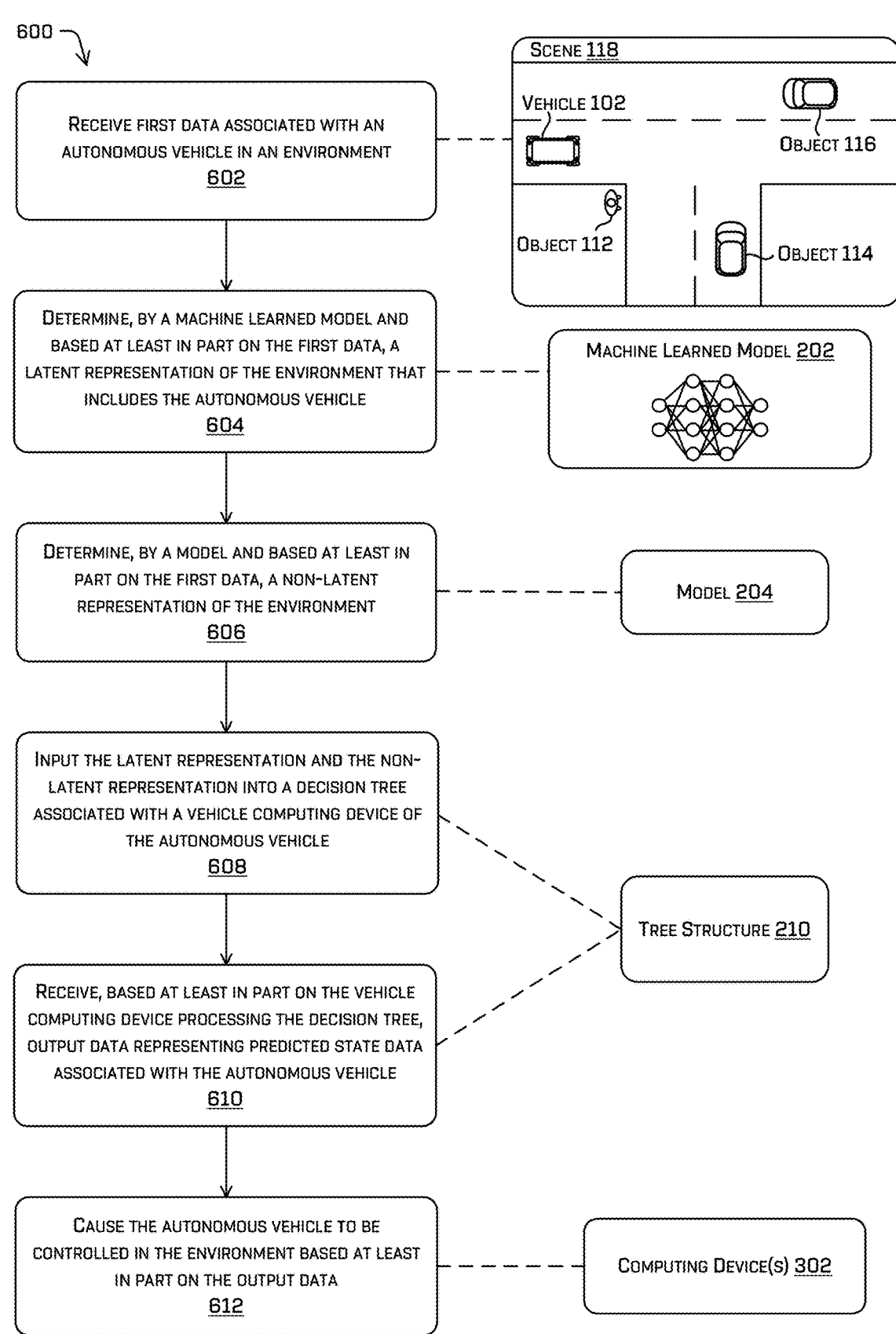

600

RECEIVE FIRST DATA ASSOCIATED WITH AN
AUTONOMOUS VEHICLE IN AN ENVIRONMENT
602

SCENE 118

VEHICLE 102

OBJECT 116

OBJECT 112

OBJECT 114

DETERMINE, BY A MACHINE LEARNED MODEL AND
BASED AT LEAST IN PART ON THE FIRST DATA, A
LATENT REPRESENTATION OF THE ENVIRONMENT THAT
INCLUDES THE AUTONOMOUS VEHICLE
604

MACHINE LEARNED MODEL 202

DETERMINE, BY A MODEL AND BASED AT LEAST IN
PART ON THE FIRST DATA, A NON-LATENT
REPRESENTATION OF THE ENVIRONMENT
606

MODEL 204

INPUT THE LATENT REPRESENTATION AND THE NON-
LATENT REPRESENTATION INTO A DECISION TREE
ASSOCIATED WITH A VEHICLE COMPUTING DEVICE OF
THE AUTONOMOUS VEHICLE
608

TREE STRUCTURE 210

RECEIVE, BASED AT LEAST IN PART ON THE VEHICLE
COMPUTING DEVICE PROCESSING THE DECISION TREE,
OUTPUT DATA REPRESENTING PREDICTED STATE DATA
ASSOCIATED WITH THE AUTONOMOUS VEHICLE
610

CAUSE THE AUTONOMOUS VEHICLE TO BE
CONTROLLED IN THE ENVIRONMENT BASED AT LEAST
IN PART ON THE OUTPUT DATA
612

COMPUTING DEVICE(S) 302

FIG. 6

COMBINING LATENT FEATURES AND NON-LATENT FEATURES BY A PLANNING SYSTEM

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future vehicle actions may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flowchart depicting an example process for predicted state data associated with an autonomous vehicle using one or more example models.

DETAILED DESCRIPTION

Figure 1:
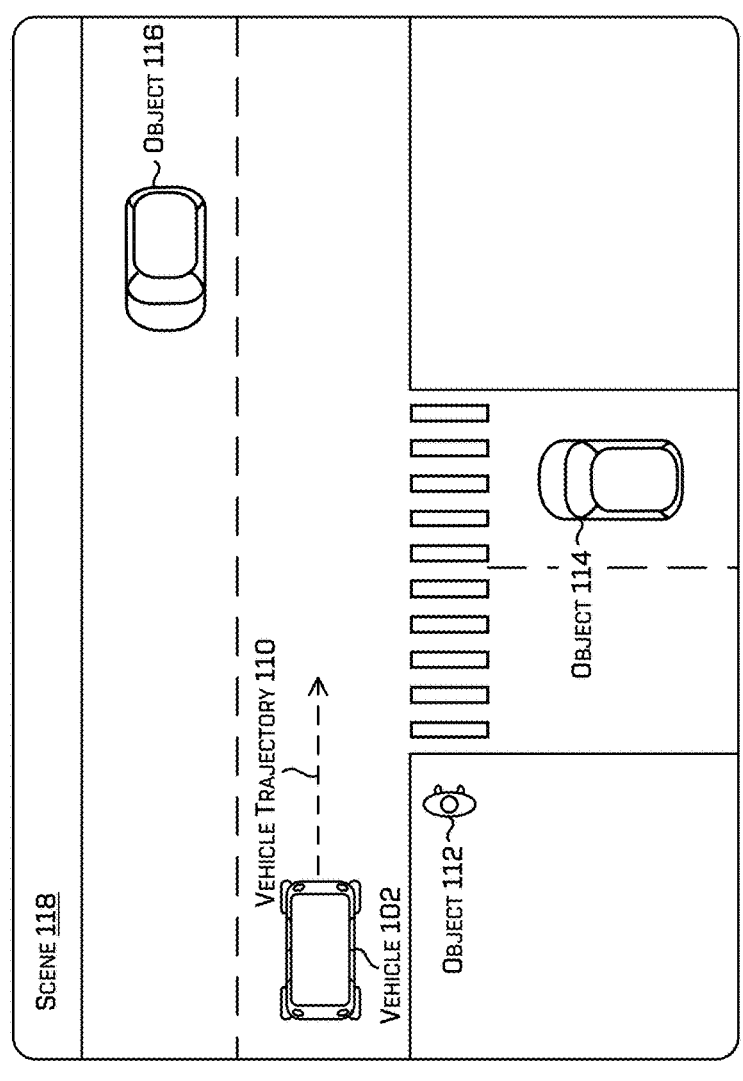
FIG. 1 is an illustration of an autonomous vehicle in an example environment, in which an example machine learned model may process input data to generate example output data.
Figure 1:
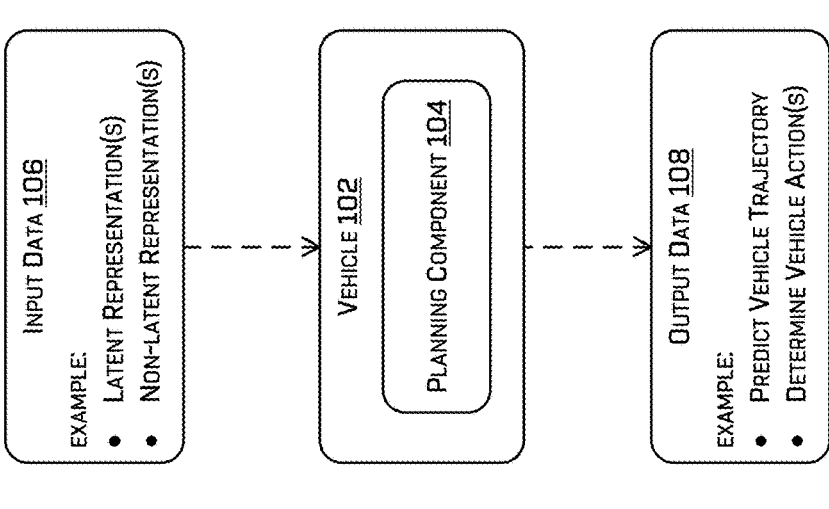

This application describes techniques for applying one or more models to predict actions for a robotic device to navigate in an environment. For example, a computing device can implement a prediction component to generate a vehicle trajectory usable for performing a simulation and/or for controlling an autonomous vehicle in the environment. The prediction component can implement a machine learned model and a statistical model in parallel to predict a trajectory, an action, or a state of the autonomous vehicle in the environment at a future time. In some examples, predictions associated with the prediction model may be considered independent of requiring a separate planning component to leverage advantages of both the machine learned model and the statistical model. For example, implementing the techniques described herein can improve safety of the autonomous vehicle by using one or more vehicle trajectories, actions, and/or predicted states that take into consideration other objects, traffic rules, drivable surfaces, etc. in the environment.

In some examples, the computing device may implement a first model (e.g., a machine learned model) to generate a latent representation of the environment and a second model (e.g., a statistical model, heuristic, or the like) to generate another representation (e.g., a non-latent representation). For example, the first model and the second model can receive input data comprising sensor data associated with a sensor coupled to the autonomous vehicle, map data, control policy data, etc. and generate different representations of the environment. The representations generated by the first model and the second model can be used, for example, during a tree search to determine or more vehicle trajectories, actions, and/or predicted states for controlling the autonomous vehicle as it navigates in the environment.

The first model and the second model may be incorporated into a single component of a vehicle computing device. For instance, instead of relying on both a prediction component and a planning component separately for determining planning operations, the techniques described herein may be generated by a prediction component that implements the first model and the second model to perform various planning operations typically performed by the planning component. In some examples, first output data from the first model and second output data from the second model can be input into a single node of the tree structure so that a tree search determines a vehicle trajectory based on the latent representation and a physical representation of the environment. The latent representation may, for example, represent an embedding that accounts for potential interactions between one or more objects in the environment and the autonomous vehicle while the physical representation may account for traffic laws, drivable surfaces, or other physical attributes of the environment. By associating data output from two different model types into a same node (e.g., a root node) of the tree structure, potential actions by the autonomous vehicle can be considered substantially simultaneously (e.g., rather than a planning component waiting to receive input from a prediction component and/or requiring computational resources for both components).

The prediction component can, in various examples, determine actions for a vehicle to use at a future time relative to one or more objects proximate the vehicle. For example, a node of the tree structure can output a first action based on the latent representation from the first model and a second action based on the physical representation from the second model, and optionally perform a simulation between the vehicle and the one or more objects. In various examples, the predicted actions (e.g., the first action, the second action, etc.) for the vehicle can be used as initial states in a simulation usable to identify a safe vehicle response to a potential action by an object (e.g., a vehicle trajectory that avoids the one or more objects in the environment). In some examples, a third model can compare the first action and the second action one to another and/or to a threshold to identify an action having the greatest likelihood of avoiding a collision with the one or more objects while also complying with traffic laws, drivable surfaces, etc. The third model may, for instance, determine a cost or a reward for each action output by a node of the tree structure.

In various examples, a machine learned model (e.g., the first model) can process one or more types of input data such as sensor data, map data, log data, state data, environmental data, etc. to derive the latent representation. A non-machine learned model (e.g. the second model) can process the input data to derive a non-latent representation of the environment. The first model may, for example, apply a reinforcement learning algorithm to generate the first output data and the second model may apply a heuristic, statistical algorithm, dynamics algorithm, and/or a kinematic algorithm to generate the second output data. As mentioned, the first output data and the second output data can be input into a same node of the tree structure to represent both latent features and non-latent features for processing in parallel.

In various examples, the machine learned model may also or instead utilize self-attention layers (e.g., an operation that compares different entities represented in the input data one to another) to represent potential object interactions (e.g., relative to the environment, relative to the autonomous vehicle, relative to another object, and so on). The machine learned model can, for example, generate an output by using the one or more self-attention layers to determine how a first object reacts to a second object in a simulation, a tree search, or the like. In some examples, the machine learned model can represent a decoder, a Convolutional Neural Network (CNN), a generator of a Generative Adversarial Network (GAN), a Graph Neural Network (GNN), a Recurrent Neural Network (RNN), or a transformer model, to name a few.

The tree structure can, in various examples, receive the first output data and the second output data as input data to determine a potential action or behavior of one or more objects in an environment (e.g., one or more of: a bounding box, an object trajectory, a heatmap showing a likelihood of occupancy by an object(s), object state data, etc.). Additionally, or alternatively, the tree structure can output scene data usable in a simulation or a sequence of simulations. An output of the tree structure can include scene data, a vehicle trajectory (with consideration to actions or behaviors of the one or more objects), vehicle actions, etc. that may be sent to the vehicle computing device for controlling the vehicle. For example, the output of the tree structure can represent a response by the vehicle to one or more object trajectories in the simulated environment usable to control the vehicle in a real-world environment.

In some examples, a model can generate scene data that includes a top-down view of an environment based at least in part on map data. The top-down view can represent one or more of: an attribute (e.g., position, class, velocity, acceleration, yaw, turn signal status, etc.) of a vehicle, history of the vehicle (e.g., location history, velocity history, etc.), an attribute of an object (e.g., velocity, position, etc.), history of the object, crosswalk permission, traffic control permissions, and the like. The data can be represented in a top-down view of the environment to capture context of the autonomous vehicle (e.g., identify actions of other vehicles and pedestrians relative to the vehicle). In some examples, the scene data can be represented by a graph, a vector representation, or other representation other than the top-down view of the environment.

In various examples, a vehicle computing device may be configured to determine actions to take while operating (e.g., trajectories to use to control the vehicle) based on predicted occupancy data, state data, scene data, etc. determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), following traffic laws, using a drivable surface, or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing device may implement different model(s) and/or component(s) to simulate future states (e.g., estimated states) by projecting an autonomous vehicle and relevant object(s) forward in the environment for the period of time (e.g., 5 seconds, 8 seconds, 12 seconds, etc.). In some examples, simulating future states can include implementing a machine learned model and a deterministic model to evaluate costs associated with a latent representation and a non-latent representation of an environment. The model(s) may project the object(s) (e.g., estimate future positions of the object(s)) forward based on a predicted trajectory associated therewith. For instance, the model(s) may predict a trajectory of a vehicle and predict attributes about the vehicle including whether the trajectory will be used by the vehicle to arrive at a predicted location in the future. The vehicle computing device may project the vehicle (e.g., estimate future positions of the vehicle) forward based on the vehicle trajectories output by the model. The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object(s) in the estimated state(s). In such examples, the relative data may include distances, locations, speeds, directions of travel, and/or other factors between the autonomous vehicle and the object. In various examples, the vehicle computing device may determine estimated states at a predetermined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing device may store sensor data associated with an actual location of an object and/or an autonomous vehicle at the end of the set of estimated states (e.g., end of the period of time) and use this data as training data to train one or more models. For example, stored sensor data (or perception or prediction data derived therefrom) may be retrieved by a model and be used as input data to identify cues of an object (e.g., identify a feature, an attribute, or a pose of the object). Such training data may be determined based on manual annotation and/or by determining a change associated semantic information of the position of the object, via machine-learned labeling, etc. Further, detected positions over such a period of time associated with the object and/or the autonomous vehicle (e.g., from log data) may be used to determine a ground truth trajectory to associate with the vehicle. In some examples, the vehicle computing device may provide the data to a remote computing device (i.e., computing device separate from vehicle computing device) for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a position or other states of the autonomous vehicle. In some examples, corresponding data may be input into the model to determine an output (e.g., an action, trajectory, and so on) and a difference between the determined output, and the actual action, trajectory, etc. by the vehicle (or actual scene data) may be used to train the model.

In some examples, training a model can include analyzing one or more costs associated with a machine learned model that generates a latent representation and one or more costs associated with another model (e.g., heuristic, etc.) that generated a non-latent representation. For instance, a training component can determine a difference between a first cost associated with the machine learned model and a second cost associated with the model, and train a machine learned model based on the lowest difference between the first cost and the second cost, the highest of the first and second cost, or otherwise.

In some examples, a model may be configured to determine an initial position of the autonomous vehicle and/or the object(s) in an environment (e.g., a physical area in which a vehicle operates and/or a simulated environment) indicated by the sensor data. The autonomous vehicle and/or the object states predicted by the models described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing device in a number of ways. The vehicle computing device may determine an action for the autonomous vehicle to take based on a search of a tree structure configured with both latent features and physical features (e.g., in a single node). In some examples, using the techniques described herein, the tree structure (or other model) may output one or more actions that accurately predict motion of the autonomous vehicle (and optionally objects in the environment) with greater detail as compared to previous models thereby improving safety of the vehicle.

The techniques discussed herein can also improve a functioning of a computing device in a number of additional ways. In some cases, different model types can output data to a node of a tree usable to determine a vehicle trajectory to consider latent information and physical information substantially simultaneously while using fewer computational resources as previous models. In some examples, the models can generate a vehicle trajectory based on an output of the node independent of processing a first node with latent information and a second node with physical information at different times. For example, the tree structure can consider the latent information and the physical information at approximately a same time to generate the vehicle trajectory using fewer processing and/or memory resources (relative to not implementing the node of the tree structure), which may simplify the generation of predictions and subsequent generation of at least one predicted trajectory. In some cases, evaluating an output by a model(s) may allow an autonomous vehicle to generate more accurate and/or safer trajectories for the autonomous vehicle to traverse an environment. These and other improvements to the functioning of the computing device are discussed herein.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example machine learned model (planning component 104) may process input data (input data 106) to generate example output data (output data 108) representing a vehicle trajectory associated with the autonomous vehicle in the environment 100. In some examples, the techniques described herein may be implemented at least partially by or in association with a vehicle computing device (e.g., vehicle computing device(s) 504) and/or a remote computing device (e.g., computing device(s) 534).

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification.

As illustrated, the vehicle 102 includes the planning component 104 that represents one or more machine learned models for processing various types of input data 106 (e.g., a latent representation(s), non-latent representation(s), etc.). The planning component 104 can, for example, determine output data 108 representing a vehicle trajectory (e.g., vehicle trajectory 110) and/or an action for the vehicle 102. The output data 108 can be used by a vehicle computing device associated with the vehicle 102 to control the vehicle 102 relative to various objects in the environment 100 such as an object 112, an object 114 and/or an object 116 (e.g., another vehicle). In some examples, the planning component 104 can determine the vehicle trajectory 110 for a scene 118 based at least in part on inputting the input data 106 into a tree structure (e.g., an output of the tree structure can comprise the vehicle trajectory 110 or an action usable for determining the vehicle trajectory).

In various examples, the output data 108 can be based at least in part on a model or component applying a control policy to the input data 106, a set of actions, or the like. For example, the planning component 104 can determine a set of action trajectories based at least in part on results of simulating the set of action trajectories using the control policy (e.g., rules of the road, right of way logic, physics, kinematics, dynamics, and the like).

In various examples, the tree structure can be encoded to consider vehicle control policies, object control policies, map data, environment data, and the like. The tree structure can, for example, represent a discrete selection or combination of potential interactions from various sets of possibilities (e.g., a particular scenario with street intersections, traffic rules, multiple objects having different intents, and so on). Each step can explore a different branch or node, or depth within a branch or node. Some nodes of the tree structure can, for instance, represent various types of object behavior to capture potential actions by the object that are both likely (e.g., the object goes straight using a trajectory) and unlikely (e.g., the object turns in front of the vehicle unexpectedly using another trajectory). Additional discussion of the tree structure can be found throughout this disclosure including in FIGS. 2 and 3 below.

In various examples, the vehicle computing device may be configured to detect one or more objects (e.g., the objects 112, 114, and/or 116) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles, remote sensors, and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a pedestrian, such as the object 112, a vehicle such as the object 114 and the object 116, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model (or the planning component 104) to determine object characteristics (e.g., maximum speed, acceleration, maneuverability, etc.). In this way, potential trajectories by an object may be considered based on characteristics of the object (e.g., how the object may potentially move in the environment).

In some examples, the input data 106 can include one or more latent representations of the environment 100 such as first output data from a machine learned model (e.g., an embedding), and one or more non-latent representations of the environment 100 such as second output data from a non-machine learned model (e.g., a statistical model, heuristic, or the like). The machine learned model can determine the first output data based at least in part on applying a reinforcement function (may also be referred to as a reinforcement algorithm or reinforcement learning algorithm) to the input data 106 during training and/or inference, and the non-machine learned model can determine the second output data based at least in part on applying a statistical function, an identity function, a dynamics function, a physics function, a deterministic function, a kinematics function, or a combination thereof. Additional details regarding using output data from multiple models in parallel in a tree structure can be found in FIGS. 2 and 3, and elsewhere. Additional details of embedding a scenario is described in U.S. patent application Ser. No. 18/071,489, filed on Dec. 1, 2022, entitled "Vehicle Control using Auto-Regressive Control Distribution Generation Based on World State Embeddings," which is incorporated herein by reference in its entirety and for all purposes.

The input data 106 may also or instead comprise log data associated with the vehicle 102 and may identify objects associated with different areas of the environment 100 at a previous time. The log data can, for instance, represent how the vehicle 102 and/or the object(s) can move in the environment 100 at a future time (e.g., in the scene 118). Additionally, or alternatively, the log data can represent a high-level behavior of the vehicle 102 of the object(s) such as a direction of travel, an indication to turn, stop, or accelerate, to name a few. In a nonlimiting example, the log data can represent a vehicle traveling in a first direction at a particular velocity and/or an object facing a second direction and not moving. In various examples, the log data can comprise traffic information such as a traffic light, a stop sign, crosswalk, a roadway (e.g., or other drivable surface), or an environmental feature.

The planning component 104 can be included in a vehicle computing device that is configured to control the vehicle 102 in the environment 100. The output data 108 from the planning component 104 can be used by the vehicle computing device in a variety of ways. For instance, information about a state of the vehicle and/or an object(s) (e.g., state data) can be used to determining one or more vehicle trajectories for controlling the vehicle 102 in the environment 100 (e.g., determine a vehicle trajectory 110 and/or control a propulsion system, a braking system, or a steering system). The output data 108 may also or instead be used to perform a simulation by setting up conditions (e.g., an intersection, a number of objects, a likelihood for the object to exhibit abnormal behavior, etc.) for use during the simulation.

In some examples, the planning component 104 can provide functionality to determine an object trajectory associated with one or more of the object 112, the object 114, or the object 116. The planning component 104 can, for example, initiate a simulation (also referred to as a scenario or estimated states) between the vehicle 102 and one or more of the objects in the scene 118 (e.g., by a decoder that receives data from the tree structure of node thereof). In some examples, the planning component 104 can determine results of the simulation by processing one or more scenes to determine a response by the vehicle 102 to a simulated object.

In some examples, the planning component 104 can represent one or more machine learned models which can vary depending upon which output data is being determined. For example, a machine learned model can receive map data (e.g., a roadway, a crosswalk, a building, etc.), sensor data, etc. and determine occupancy information such as a point, contour, or bounding box associated with an object as part of the input data 106.

A training component associated with a computing device such as the computing device(s) 534 (not shown) and/or the vehicle computing device(s) 504 (not shown) may be implemented to train the planning component 104. For example, the training component can train a first machine learned model that analyzes an environment to determine a set of actions using a reinforcement learning algorithm and/or a second machine learned model that propagates nodes of a tree search (e.g., a multilayer perceptron, transformer model, etc.). Thus, training data may vary according to which machine learned model is being trained. For example, the training data can include a wide variety of data, such as sensor data, map data, bounding box data, real-world or labelled scenes, trajectories, etc., that is associated with a value (e.g., a desired classification, inference, prediction, etc.). In some examples training data can comprise determinations based on sensor data, such as a bounding boxes (e.g., two-dimensional and/or three-dimensional bounding boxes associated with an object), segmentation information, classification information, a vehicle trajectory, an object trajectory, and the like. Such training data may generally be referred to as a "ground truth." To illustrate, the training data may be used for generating a vehicle trajectory based on outputs from one or more models (e.g. a machine learned model, a statistical model, or a combination thereof).

In some examples, the training component can determine a loss for the first machine learned model based on a worst cost between a first cost associated with a machine learned model that evolves a state of the environment represented by the latent representation based on an action and a second cost associated with another model that generates evolves a non-latent representation of the environment based on the action and a deterministic/heuristic model. Selecting the greater of the two costs may, in some examples, may serve to pick a more conservative approach used by the machine learned model or the model. Additional discussion of training various models is discussed throughout this disclosure including in FIG. 3.

Figure 2:
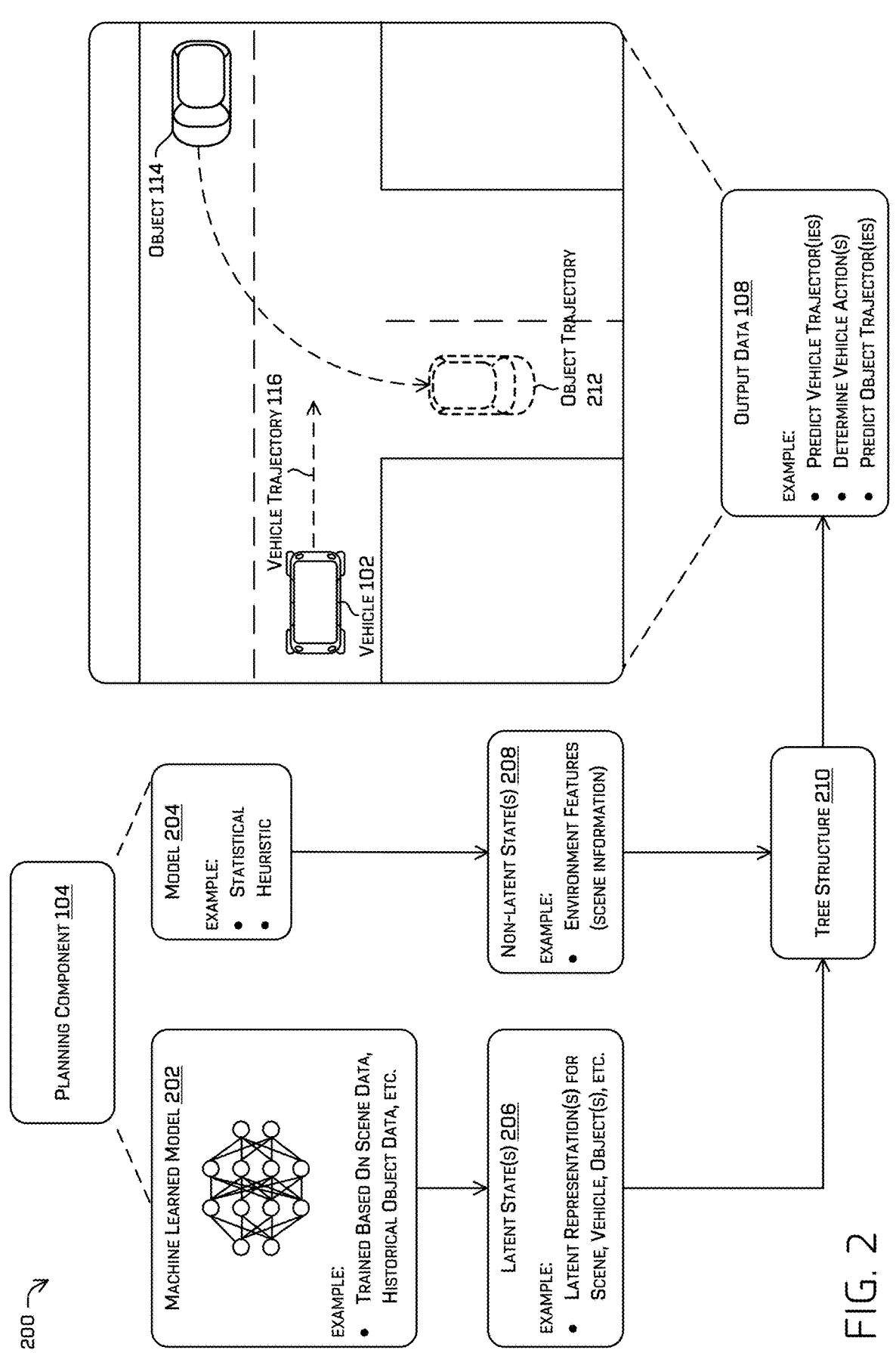
FIG. 2 illustrates an example block diagram of an example computer architecture for implementing techniques to generate example output data, as described herein.

FIG. 2 illustrates an example block diagram 200 of an example computer architecture for implementing techniques to generate example output data, as described herein. The example block diagram 200 includes a computing device (e.g., the vehicle computing device(s) 504 and/or the computing device(s) 534) that includes the planning component 104 in FIG. 1. The techniques described in FIG. 2 can be associated with the vehicle 102 (or the vehicle 502) such as when the vehicle navigates in a real-world environment or a simulated environment.

As illustrated, the planning component 104 can receive the input data 106 for processing by a machine learned model 202 and a model 204. For example, the machine learned model 202 can apply a first function (e.g., a learned dynamic function) to determine a latent representation of the environment 100 and the model 204 can apply a second function (e.g., a dynamic function based on a statistic, heuristic, etc.) to determine a non-latent representation of the environment. In various examples, the machine learned model 202 may be trained based at least in part on scene data, historical vehicle data, historical object data, environmental data, etc. A reinforcement model (not shown) can determine a set of actions to explore. In some examples, the reinforcement model (also referred to herein as a reinforcement learning model) can output a best action and/or set of actions to explore between discrete steps of a tree search based on receiving state data (e.g., a latent state, a non-latent state). Such a reinforcement model may represent a policy that may be modified over time based on the input to improve selection of an action output by a node of a tree structure. During training of the reinforcement model, a loss associated with a model(s) that determines the state data (and/or a predicted latent representation, a predicted non-latent representation, or the like) for a respective node may also be received as input to improve future determinations by the third model.

The input data 106 can include, for example, map data representing a top-down view of an environment. For instance, the map data can represent top-down multi-channel data indicative of a top-down representation of an environment (e.g., wherein each channel or layer comprises data about the scene 118). The top-down representation may be determined based at least in part on map data and/or sensor data (e.g., lidar data, radar data, image data, etc.) captured from or associated with a sensor of the vehicle 102, and may represent a top-down view of the environment to capture context of the vehicle (e.g., identify actions of other objects such as vehicles and pedestrians relative to the vehicle). In some examples, such channels may represent, for example, occupancy, speed, lane indications, speed limits, traffic control, object type, etc. The top-down representation can include a channel(s) to represent one or more of: an attribute (e.g., position, class, velocity, acceleration, yaw, turn signal status, etc.) of the vehicle, history of the vehicle (e.g., location history, velocity history, etc.), an attribute of the object (e.g., velocity, position, etc.), crosswalk permission, traffic light permission, and the like.

In some examples, the machine learned model 202 can generate, output, or otherwise determine one or more latent states 206 to represent a scene (e.g., the scene 118), the vehicle 102, one or more objects in the environment (e.g., the object 112, the object 114, and/or the object 116), traffic control information, drivable services (e.g., a roadway boundary, a roadway centerline, etc.), or the like. The model 204 can, for example, output one or more non-latent states 208 (e.g., a real state, heuristic state, dynamic state, etc.) represent features of the environment 100 such as a scene (e.g., the scene 118), the vehicle 102, one or more objects in the environment, traffic control information, drivable services (e.g., a roadway boundary, a roadway centerline, etc.), or the like. The latent state(s) 206 can represent an embedding of a real-world scene into a machine learned space, for example. The non-latent state(s) 208 can, for example, comprise a state of a real-world environment based on the model 204 processing sensor data, map data, log data, state data (e.g., of the vehicle and/or the object(s) in the environment). In some examples, the lates state(s) 206 can include a latent representation that is an intermediate output of the machine learned model 202 and the non-latent state(s) 208 can include a non-latent representation comprising one or more of a velocity, an orientation, or a location as an output of the model 204 (e.g., a statistical model).

In some examples, the latent state(s) 206 and the non-latent state(s) 208 can be used as input data into a tree structure 210. For example, a latent state and a real state can be input into a same node of the tree structure 210. In various examples, a vehicle computing device associated with the vehicle 102 can implement the tree structure 210 to determine a vehicle trajectory and/or different potential scenarios between the vehicle 102 and an object(s) (e.g., the object 112, the object 114, and/or the object 116). For example, the tree structure 210 can indicate a control policy for the vehicle and/or the object(s) in the environment as well as traffic rules, signal information, or other map features of the environment. In some examples, a node of the tree structure can indicate an attribute (e.g., position, class, velocity, acceleration, yaw, turn signal status, etc.) of the vehicle 102, history of the vehicle 102 (e.g., location history, velocity history, etc.), an attribute of an object(s) (e.g., velocity, position, etc.), history of the object(s), crosswalk permission, traffic light permission, and the like. In various examples, the tree structure 210 can represent scenarios, actions, or the like that consider a potential intersection with an object, and optionally, a vehicle trajectory to avoid the potential intersection. For example, the vehicle trajectory determined using a tree search having both latent representations and non-latent representations can be safer than previous vehicle trajectories produced using typical approaches by considering either the latent state(s) 206 (or representations associated therewith) or the non-latent state(s) 208 alone. Tree searches using a latent representation alone may have advantages in being able to utilize all data in a complex environment. However, such trajectories may not be inspectable. On the other hand, generating by heuristic functions alone may be inspectable (e.g., it may be possible to deduce rationale for output), but are limited based on human intuition. Creating two independent tree searches using either methodology may be computationally prohibitive. By determining the vehicle trajectory based on a combination of models, advantages of using the machine learned model 202 (e.g., considering more potential interactions in the environment than a non-machine learned model) can be combined with advantages of using the model 204 (e.g., considering dynamics of the vehicle, driving surfaces, traffic laws, etc.) given that the machine learned model 202 and the model 204 are capable of evaluating at least some different aspects of the environment.

In various examples, the output data 108 can be based at least in part on the planning component 104 (or model(s) thereof) applying a control policy to the set of actions. For example, the planning component 104 can determine one or more actions and/or trajectories based at least in part on results of simulating the action(s) and/or trajectories using the control policy (e.g., rules of the road, right of way logic, physics, kinematics, dynamics, and the like).

In some examples, the tree structure 210 can receive, as at least part of the input data 106, vector representations based on a polyline (e.g., a set of line segments) representing one or more map elements. For instance, the planning component 104 can encode and aggregate the polyline into a node data structure representing with the map element(s). For example, the vehicle 102, the object(s), or a feature of the environment can be represented by polylines (e.g., a lane can be segmented into a number of smaller line segments whose length, location, orientation angle (e.g., yaw), and directionality, when aggregated, define the lane). Similarly, a crosswalk (or other feature of the environment) may be defined by four connected line segments, and a roadway edge or roadway centerline may be multiple connected line segments.

In some examples, the tree structure 210 can determine nodes to represent and/or to determine one or more vehicle actions (e.g., a turning action, braking action, acceleration action such as yielding to or slowing for an object to safely enter in front of the vehicle). The tree structure 210 may also or instead determine a node(s) for determining one or more vehicle actions and/or object actions (e.g., a future action). An object action can represent a level of attentiveness of the object, such as whether the object will react to the vehicle with a first level of reactiveness or a second level of reactiveness, or in some cases, not react to the vehicle during a simulation. In various examples, different levels of reactiveness can be associated with different maximum thresholds for the object to accelerate, brake, or steer. The vehicle action(s) and/or the object action(s) derived from one or more nodes can include, for example, one or more of: a) a reactive action in which an object or the vehicle changes lanes, brakes, accelerates, decelerates, etc., b) a right turn, c) a left turn, d) a straight action, e) an acceleration action, f) a deceleration action, g) a parking action, h) a remain in place action, etc.

In some examples, a node(s) of the tree structure 210 can be associated with one or more regions surrounding the vehicle (e.g., a region most likely to include a potential intersection point with an object). For example, the tree structure 210 can receive one or more regions from the planning component 104 (a model thereof) or other model or component indicative of a relevant region from among a set of regions in an environment of the vehicle. For instance, the tree structure 210 can include node(s) to represent an occluded region, a region in front of the vehicle, or other area within a predetermined distance of the vehicle. In some examples, the vehicle is a bi-directional vehicle, and as such, the planning component 104 can define, identify, or otherwise determine the rear region relative to a direction of travel as the vehicle navigates in the environment. For instance, the rear region of the vehicle can change depending upon the direction of travel. In at least some examples, the environment may be encoded as a vector representation and output from the machine learned model 202 as an embedding. Such an embedding may be used in predicting the future trajectory(ies), action(s), state(s), etc. of the vehicle and/the object(s).

In various examples, the output data 108 can represent one or more vehicle trajectories, vehicle actions, or object trajectories. The output data may also or instead represent predicted state data including one or more of: position data, orientation data, heading data, velocity data, speed data, acceleration data, yaw rate data, or turning rate data associated with the vehicle 102 and/or the object(s).

Figure 3:
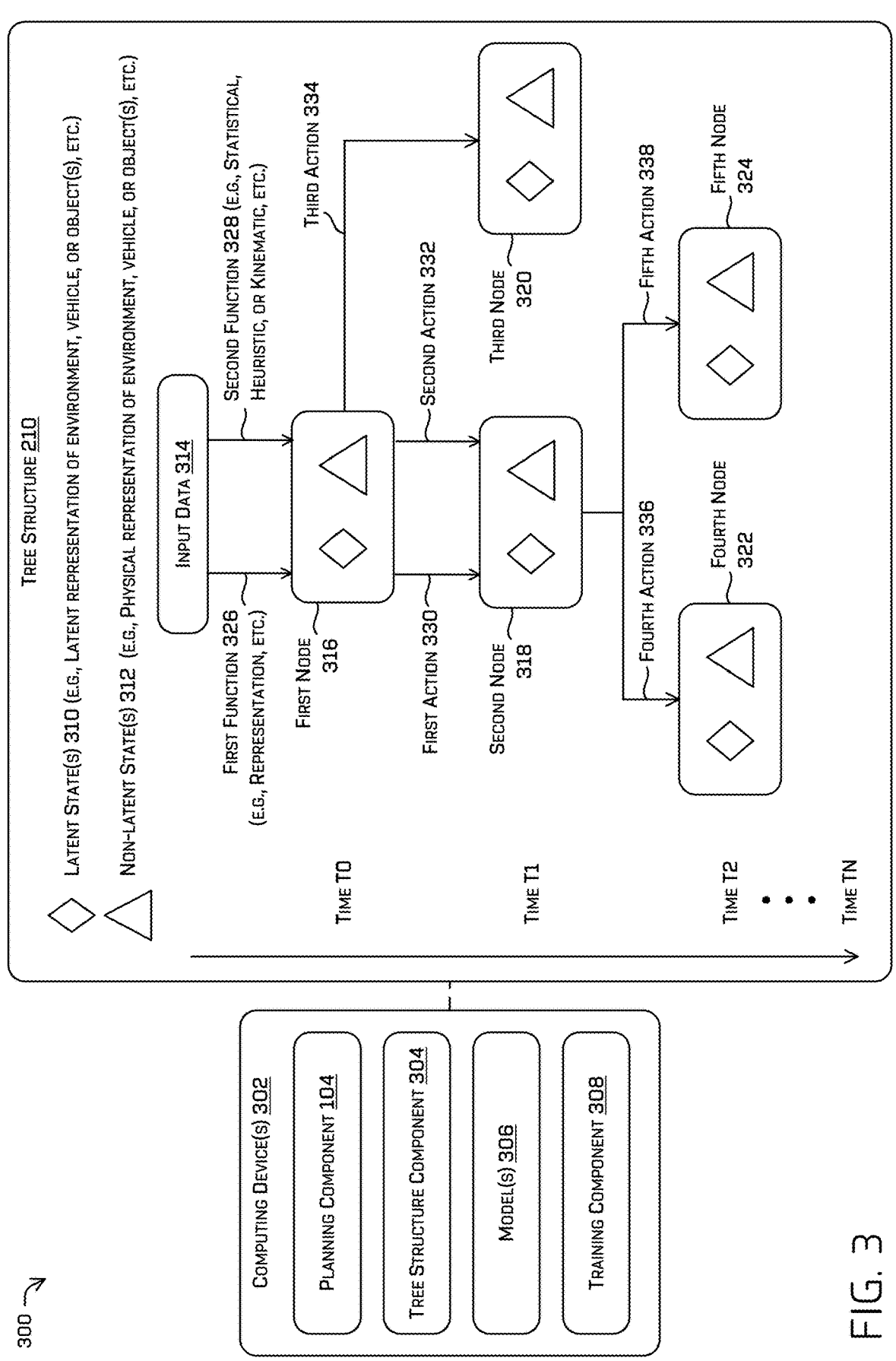
FIG. 3 illustrates another block diagram of an example computer architecture for implementing techniques by a tree structure to generate example output data, as described herein.

FIG. 3 illustrates another block diagram 300 of an example computer architecture for implementing techniques by a tree structure to generate example output data, as described herein. The example block diagram 300 includes one or more computing devices 302 (e.g., the vehicle computing device(s) 504 and/or the computing device(s) 534) that includes the planning component 104, a tree structure component 304, model(s) 306, and a training component 308. In some examples, the techniques described in relation to FIG. 3 can be performed as the vehicle (the vehicle 102 or the vehicle 502) navigates in the environment 100 (e.g., a real-world environment or a simulated environment) to generate the output data 108.

In various examples, the computing device(s) 302 can implement the tree structure component 304 to determine the tree structure 210 representing different potential scenarios between the vehicle 102 and an object(s) (e.g., the object 114 and the object 116) in the environment 100. The tree structure component 304 can, for example, generate nodes of the tree structure 210, one or more actions associated with a node, and further determine which action(s) to propagate to another node over time (e.g., intermediate output data). The tree structure component 304 can also determine a final output of exploring various nodes over time representing a vehicle trajectory, final action, or the like.

The tree structure 210 can comprise one or more latent states 310 and/or one or more non-latent states 312. In some examples, a latent state and a non-latent state can be determined for each generated node of the tree structure 210. For example, the tree structure 210 can associate the latent representation and the non-latent representation into a node (e.g., a root node) of the tree structure 210. The latent state(s) 310 can include a representation of an environment (e.g., the environment 100), a vehicle (e.g., the vehicle 102 or the vehicle 502), and/or an object (e.g., a static or dynamic object such as the object 112, the object 114, or the object 116), though other representations are also possible in various examples. The non-latent state(s) 312 can include a physical representation of the environment, the vehicle, and/or the object, a statistical representation, a dynamics representation, a heuristic representation, just to name a few. In some examples, the latent state(s) 310 can comprise the latent state(s) 206 and the non-latent state(s) 312 can comprise the non-latent state(s) 208.

The tree structure component 304 can implement one or more of the model(s) 306 to generate the nodes of the tree structure 210. For example, such a model may propagate the state of an environment associated with one node to a node at a future time. FIG. 3 depicts the tree structure 210 comprising a first node 316, a second node 318, a third node 320, a fourth node 322, a fifth node 324, though other number of nodes are possible. In various examples, the tree structure component 304 can generate the tree structure 210 based at least in part on one or more of: an attribute of the vehicle 102 (e.g., velocity, position, etc.), history of the vehicle 102 (e.g., location history, velocity history, etc.), an attribute (e.g., position, velocity, acceleration, yaw, etc.) of an object, history of the object, and/or features of the environment (e.g., roadway boundary, roadway centerline, crosswalk permission, traffic light permission, and the like). In some examples, a node of the tree structure 210 can be associated with various costs (e.g., comfort cost, safety cost, distance cost, brake cost, obstacle cost, etc.) usable for determining an optimized trajectory (e.g., also referred to herein as performing an optimization of the tree structure to determine an output trajectory) for the vehicle to travel (e.g., controlling the vehicle in accordance with the output trajectory).

In various examples, reinforcement learning can be used to determine a best action or a set of actions associated with a tree search of the tree structure 210. Output data of a tree search can be evaluated over time to determine accuracy of an action selected to improve action determinations and/or selections in the future. In some examples, the tree structure component 304 can select one of the actions (e.g., the first action 330, the second action, 332, or the third action 334) associated with the first node 316 as a final output of the tree structure 210 and/or to propagate to the second node 318. In some examples, at least some of the actions (e.g., the first action 330, the second action 332, and the third action 334) may be referred to as a set of proposed actions. For example, the tree structure component 304 can determine a first cost associated with the first latent state (e.g., a latent representation) of the first node 316 and a second cost associated with the first non-latent state (e.g., a non-latent representation) of the first node 316. The tree structure component 304 can also or instead compare the first cost and the second cost one to another and/or to a cost threshold and select the first latent state or the first non-latent state having the lowest cost as an output of the tree structure 210 and/or as an action to propagate to the second node 318. For example, an action associated with a lowest cost can be selected to control the vehicle in the environment thereby improving safety of the vehicle as it navigates in the environment.

In various examples, an output of a tree search associated with the tree structure 210 can cause the vehicle to be controlled in the environment. For instance, during a rollout of the tree search various actions can be identified as the potentially safest actions, and during training, backpropagation of the tree search can sum up costs and/or rewards associated with the most relevant actions determined during the rollout. In this way, a tree search of the tree structure 210 using a trained model can determine a vehicle trajectory that represents the safest action(s) among the available actions of the tree search. Additional costs can be determined for one or more actions associated with different nodes. A cost can represent a reward from the tree structure component 304 (or model thereof) applying a reinforcement learning algorithm, or heuristic to the output of a node using the following equation.

$$G^k = \sum_{\tau}^{l-1-k} \gamma^\tau \min\left(r_{ML_{k+1+\tau}}, r_{REAL_{k+1+\tau}}\right) + \gamma^{l-k} v^l$$

where $\gamma$ represents a constant variable, $r_{ML}$ represents a reward of the machine learned model 202, $r_{REAL}$ represents a reward of the model 204, and v represents a value function that estimates a cost for the vehicle to navigate to a destination.

As shown in FIG. 3, the tree structure 210 is associated with a period of time. For example, time T0 represents a first time of the tree structure 210 and is generally associated with the first node 316 and time T1 represents a second time generally associated with the second node 318 and the third node 320. However, each progression of the tree structure 210 to a new node does not necessarily imply a new time (e.g., T0, T1, etc. is not scaled to the nodes in FIG. 3 but used to show a progression of time generally).

In some examples, each layer of the tree structure can be associated with a particular time (e.g., the first node 316 is associated with time T0, the second node 318 and the third node 320 are associated with time T1, the fourth node 322 and the fifth node 324 are associated with time T2, and so on for additional branches or nodes (not shown) up to time TN, where N is an integer. In various examples, different layers, branches, or nodes can be associated with different times in the future. In various examples, scenarios associated with one or more of the nodes of the tree structure 210 can run in parallel on one or more processors (e.g., Graphics Processing Unit (GPU) and/or Tensor Processing Unit (TPU), etc.).

In some examples, the tree structure component 304 can receive input data 314 and apply a first function 326 (e.g., a representation function, etc.) to generate a latent state (e.g., a first latent state) of the first node 316. Additionally, or alternatively, the tree structure component 304 apply a second function 328 (e.g., a statistical function, a heuristic, dynamics function, kinematic function, etc.) to the input data 314 to generate the non-latent state (e.g., a first non-latent state) of the first node 316. States for additional nodes can also be determined using the first function 326 and/or the second function 328 based at least in part on an output from a previous node.

The input data 314 can include one or more of: scene data, sensor data, state data (e.g., of a vehicle, an object, or a combination thereof), map data associated with an environment, etc. In various examples, the first function 326 and the second function 328 can be applied to the same input data representing the environment 100.

In various examples, the first node 316 can include the latent state and the non-latent state determining using a machine learned model of the model(s) 306 that implements the first function 326 and a model of the model(s) 306 that implements the second function 328. In some examples, the model(s) 306 can include the machine learned model 202 and the model 204.

The first node 316 can be associated with a first action 330, a second action 332, and/or a third action 334 associated with the vehicle 102, though any number of actions may be output depending on examples. For instance, the first action 330 can be based at least in part on the first function 326 and the first latent state and the second action 332 can be based at least in part on the second function 328 and the heuristic state. The third action can be based at least in part on the first function 326, the first latent state, the second action 332 and the first heuristic state. The second node 318, the third node 320, the fourth node 322, and the fifth node 324 can be associated with respective latent states and heuristic states for generating respective vehicle actions (e.g., a proposed action or action for the vehicle to take in the future). In various examples, the second node 318, the third node 320, the fourth node 322, and/or the fifth node 324 can determine respective actions for applying to the vehicle over a period of time. For example, the second node 318 can determine a fourth action 336 and a fifth action 338.

The tree structure 210 may incorporate one or more models such as a first model to encode a scene representation to an embedding. A second model (e.g., an encoder, multi-layer perceptron (MLP), transformer model, etc.) can process the input data 314 by applying the first function 326 to evolve a latent representation (or latent state(s) 310) represented by the embedding or environment and the second function 328 to evolve a physical representation (or non-latent state(s) 312) of a statistical representation of the environment. The second model can propagate respective latent representations (may also be referred to as predicted latent representations of the scene representation) based on the current state and a proposed action through a node of the tree structure 210. Such actions may be determined based on inputting the latent representation into a reinforcement model trained to output suggested actions, for example, the first action 330, the second action 332, and the third action 334 associated with the first node 316, or other actions associated with another node(s) of the tree structure 210. In some examples, a best actions (e.g., actions having the highest reward) may be determined for use in determining a final action for the vehicle 102 to follow in the environment. A fourth model (e.g., the decoder 402 of FIG. 4), can evaluate the representations (e.g., a predicted latent representation and/or a predicted non-latent representation) determined by the second model (e.g., determine a loss) to identify how well the second model determines representations of the environment or the embedding from respective states of a node. As a non-limiting example, such a model may comprise a reconstruction of the environment from the propagated or evolved latent representation and compared with a recorded version of the future environment (e.g., a predicted environment). Any losses may be used to refine the model used for latent representation evolution/propagation.

The first action 330, the second action 332, the third action 334, the fourth action 336 or the fifth action 338 can comprise one of: a yield action, a drive straight action, a left turn action, a right turn action, a brake action, an acceleration action, a steering action, or a lane change action and may optionally represent a position of the vehicle, a heading of the vehicle, a velocity of the vehicle, and/or an acceleration of the vehicle.

In some examples, the computing device(s) 302 can implement the tree structure component 304 to generate the tree structure 210 based at least in part on state data associated with the vehicle and one or more objects in an environment. The state data can include data describing an object(s) in an environment, such as in example environment 100. The state data can include, in various examples, one or more of position data, orientation data, heading data, velocity data, speed data, acceleration data, yaw rate data, or turning rate data associated with the object(s) and/or the vehicle.

In some examples, the tree structure component 304 can use a heuristic and/or a machine learned model to determine whether to expand a branch or node of the tree structure 210. For instance, the machine learned model can be trained to determine whether to expand a child branch/node, group actions, and/or expand leaf node upper and lower bounds for determining an optimal trajectory.

FIG. 3 further depicts the training component 308 to train an example machine learned model of the model(s) 306. For example, the computing device(s) 302 can implement the training component 308 to process training data and output a trained machine learned model that determines an action or trajectory for the vehicle.

In some examples, the training component 308 can process the training data to output scene data, an action(s), a trajectory(ies), etc. depending on the machine learned model being trained. In some examples, the machine learned model can represent the planning component 104, the machine learned model 202, the model 204, or the decoder 402 of FIG. 4. By training the machine learned model as described herein, determinations by the machine learned model can provide more accurate depictions of potential interactions between the vehicle and the object(s) in an environment.

In various examples, the training component 308 can process the training data (e.g., vehicle state data, object state data, latent states heuristics states, environment data, etc.) to determine action data and/or trajectory data for the vehicle. In some examples, the training data can represent ground truth data, and the training component 308 can compare the ground truth data to an output by the machine learned model (e.g., an action or trajectory by the vehicle) as part of backpropagation. The machine learned model can be trained to minimize loss associated with the output and maximize accuracy of the output to represent different scenarios with different objects. In some examples, the training component 308 can train a model (e.g., the aforementioned second model) to decode the embedding that has been propagated through the tree structure 210 and output a reconstruction loss (e.g., how well the embedding matches ground truth representing actions in a real-world environment). The training component 308 can also or instead train another model (e.g., the aforementioned reinforcement model) by performing reinforcement learning techniques. For example, the training component 308 can improve output data by the reinforcement model over time by determining associated costs with both the latent and non-latent propagations (e.g., a predicted latent representation and a predicted non-latent representation) including, for example, costs based on safety, progress, comfort, etc.

In some examples, the vehicle computing device may provide data associated with training the machine learned model to a remote computing device (i.e., computing device separate from vehicle computing device) for data analysis. In such examples, the remote computing device may analyze the data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a trajectory of an object or a vehicle. In some examples, corresponding data may be input into the machine learned model to determine an output (e.g., a bounding box, object state data, and so on) and a difference between the determined output, and the actual action by the object may be used to train the model.

Figure 4:
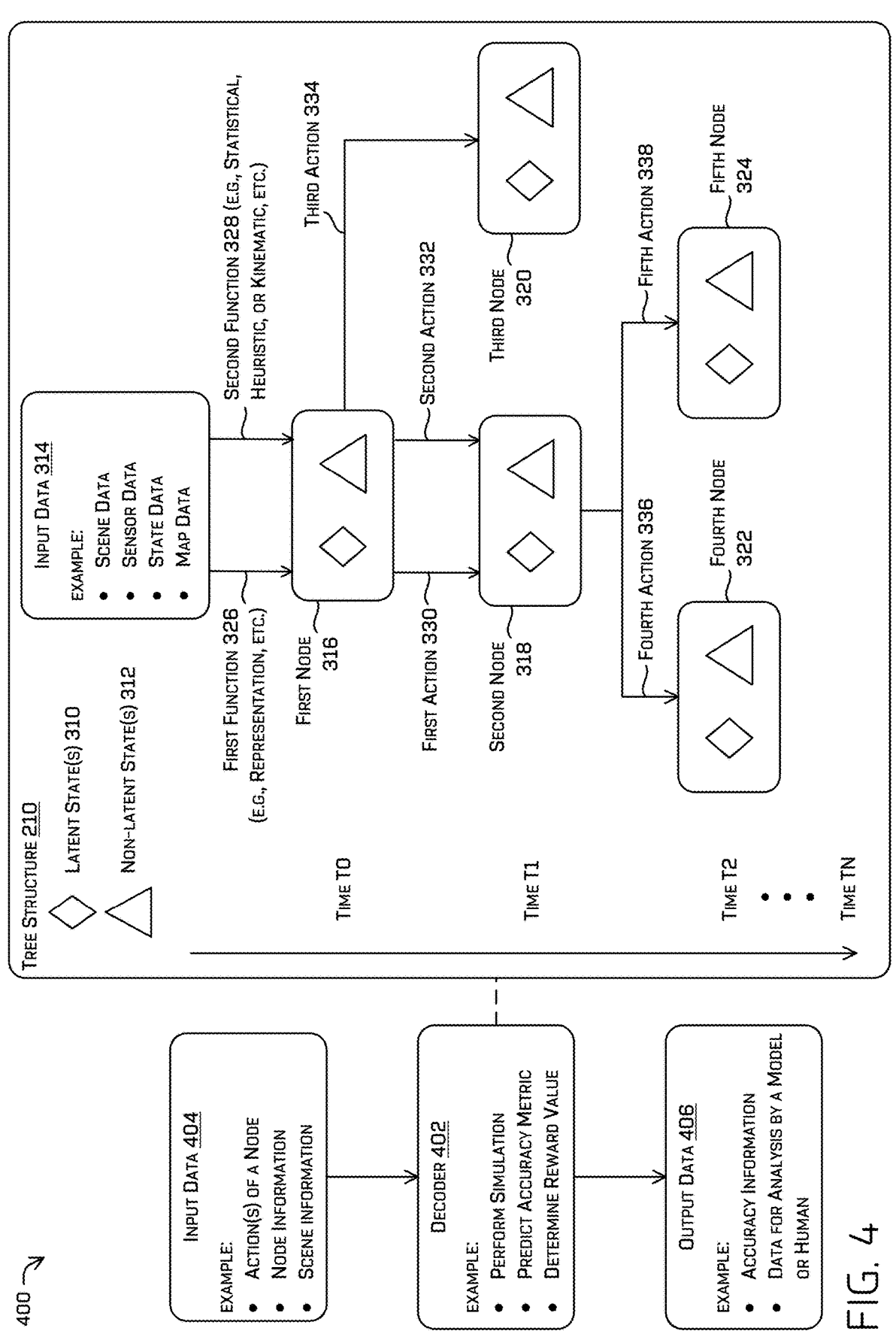
FIG. 4 illustrates an example block diagram of an example decoder implemented by a computing device to generate example output data, as described herein.

FIG. 4 illustrates an example block diagram 400 of an example decoder (decoder 402) implemented by a computing device to generate example output data, as described herein. The techniques described in the example block diagram 400 may be performed by a computing device such as the computing device(s) 302, the vehicle computing device(s) 504, and/or the computing device(s) 534. The decoder 402 can receive input data 404 comprising an action of a node, node information, scene information, etc. for determining output data 406 (e.g., accuracy information and/or data for analysis).

In various examples, the computing device(s) 302 of FIG. 3 can represent a variable autoencoder comprising an encoder (not shown) and the decoder 402. In various examples, the decoder 402 can receive data output from a node of the tree structure 210, such as the first action 330, the second action 332, and/or the third action 334 from the first node 316. For example, node information from one or more nodes can be sent to the decoder 402 for determining an accuracy metric of the respective action in a simulation. Accuracy information for each action processed by the decoder 402 can be sent to a computing device (or human such as an engineer) for analysis. By analyzing the data output by the decoder, subsequent rewards, costs, and/or accuracy metrics determined by the tree structure component 304 can be improved over time.

In some examples, the decoder 402 can represent a machine learned model such as a CNN, a GNN, a GAN, an RNN, a transformer model, and the like. As discussed elsewhere herein, the decoder 402 can be trained based at least in part on sensor data, map data, state data, log data, or the like.

Figure 5:
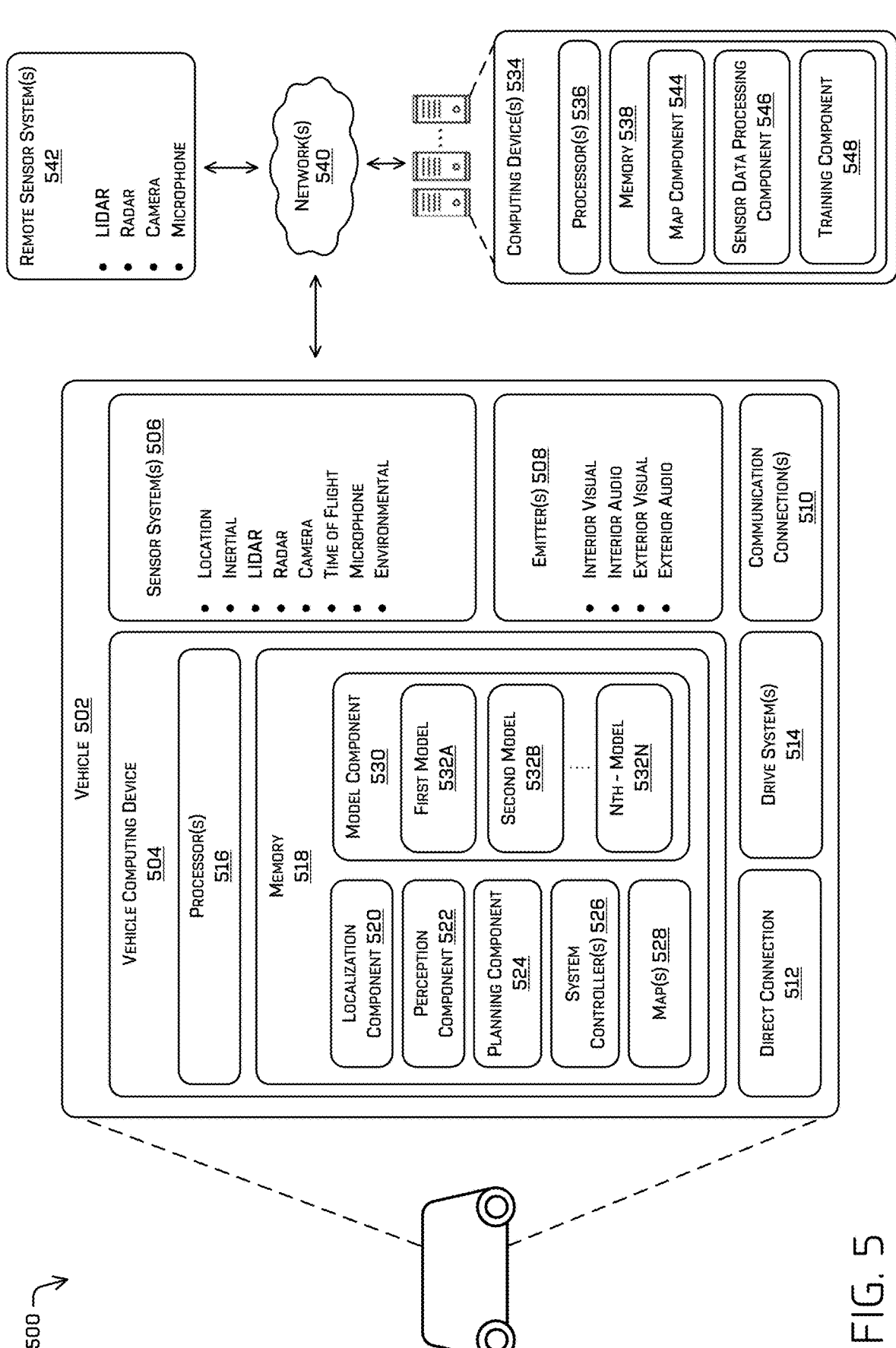
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device(s) 504, one or more sensor systems 506, one or more emitters 508, one or more communication connections 510, at least one direct connection 512, and one or more drive system(s) 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computing device(s) 504 may store sensor data associated with actual location of an object at the end of the set of estimated states (e.g., end of the period of time) and may use this data as training data to train one or more models. In some examples, the vehicle computing device(s) 504 may provide the data to a remote computing device (i.e., computing device separate from vehicle computing device such as the computing device(s) 534) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference in its entirety and for all purposes.

In the illustrated example, the memory 518 of the vehicle computing device(s) 504 stores a localization component 520, a perception component 522, a planning component 524, one or more system controllers 526, one or more maps 528, and a model component 530 including one or more model(s), such as a first model 532A, a second model 532B, up to an Nth model 532N (collectively "models 532"), where N is an integer. Though depicted in FIG. 5 as residing in the memory 518 for illustrative purposes, it is contemplated that the localization component 520, a perception component 522, a planning component 524, one or more system controllers 526, one or more maps 528, and/or the model component 530 including the model(s) 532 may additionally, or alternatively, be accessible to the vehicle 502 (e.g., stored on, or otherwise accessible by, memory remote from the vehicle 502, such as, for example, on memory 538 of a remote computing device 534). In some examples, the model(s) 532 can provide functionality associated with the planning component 104. In some examples, the model(s) 532 can include one or more of: an encoder, a quantizer, a codebook, a decoder, a transformer model, a machine learned model, and so on.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 544, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device(s) 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computing device(s) 534) accessible via network(s) 540. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device(s) 504 may include a model component 530. The model component 530 may be configured to perform the functionality of the planning component 104, including predicting vehicle trajectories, vehicle actions, object trajectories, scene data, etc. based at least in part on an output of a tree structure comprising latent and non-latent representation or states. In various examples, the model component 530 may receive one or more features associated with the detected object(s) from the perception component 522 and/or from the sensor system(s) 506. In some examples, the model component 530 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the model component 530 could be part of the planning component 524 or other component(s) of the vehicle 502.

In various examples, the model component 530 may send predictions from the one or more models 532 that may be used by the planning component 524 to generate one or more predicted trajectories of the object (e.g., direction of travel, speed, etc.) and/or one or more predicted trajectories of the object (e.g., direction of travel, speed, etc.), such as from prediction component thereof. In some examples, the planning component 524 may determine one or more actions (e.g., reference actions and/or sub-actions) for the vehicle 502, such as vehicle candidate trajectories. In some examples, the model component 530 may be configured to determine whether an object occupies a future position based at least in part on the one or more actions for the vehicle 502. In some examples, the model component 530 may be configured to determine the actions that are applicable to the environment, such as based on environment characteristics, weather characteristics, another object, or the like.

In some examples, the model component 530 may be used for planning operations instead of requiring use of the planning component 524.

The model component 530 may generate sets of estimated states of the vehicle and one or more detected objects forward in the environment over a time period. The model component 530 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 530 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 530 may generate estimated states at 0.1 second intervals throughout the time period. For another example, the model component 530 may generate estimated states at 0.05 second intervals. The estimated states may be used by the planning component 524 in determining an action for the vehicle 502 to take in an environment.

In various examples, the model component 530 may utilize machine learned techniques to predict object trajectories and scene data. In such examples, the machine learned algorithms may be trained to determine, based on sensor data and/or previous predictions by the model, that an object is likely to behave in a particular way relative to the vehicle 502 at a particular time during a set of estimated states (e.g., time period). In such examples, one or more of the vehicle 502 state (position, velocity, acceleration, trajectory, etc.) and/or the object state, classification, etc. may be input into such a machine learned model and, in turn, a trajectory prediction may be output by the model.

In various examples, characteristics associated with each object type may be used by the model component 530 to determine a trajectory, a velocity, or an acceleration associated with the object. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 520, the perception component 522, the planning component 524, the one or more system controllers 526, the one or more maps 528, the model component 530 including the model(s) 532 are described as divided for illustrative purposes. However, the operations performed by the various components may be combined or performed in any other component, or by a single component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional tree structures), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, backpropagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally, or in the alternative, the sensor system(s) 506 may send sensor data, via the one or more networks 540, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 534, other nearby vehicles, etc.) and/or one or more remote sensor system(s) 542 for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device(s) 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 540, to the computing device(s) 534. In at least one example, the localization component 520, the perception component 522, the planning component 524, the one or more system controllers 526, the one or more maps 528, and the model component 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 540. In some examples, the vehicle 502 may receive sensor data from the computing device(s) 534 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 534 may include processor(s) 536 and a memory 538 storing the map component 544, a sensor data processing component 546, and a training component 548. In some examples, the map component 544 may include functionality to generate maps of various resolutions. In such examples, the map component 544 may send one or more maps to the vehicle computing device(s) 504 for navigational purposes. In various examples, the sensor data processing component 546 may be configured to receive data from one or more remote sensors, such as sensor system(s) 506 and/or remote sensor system(s) 542. In some examples, the sensor data processing component 546 may be configured to process the data and send processed sensor data to the vehicle computing device(s) 504, such as for use by the model component 530 (e.g., the model(s) 532). In some examples, the sensor data processing component 546 may be configured to send raw sensor data to the vehicle computing device(s) 504.

In some instances, the training component 548 (e.g., trained in accordance with the techniques discussed in FIG. 4) can include functionality to train a machine learning model to output probabilities for whether an occluded region is free of any objects or whether the occluded region is occupied by a static obstacle or a dynamic object. For example, the training component 548 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 548 may be executed by the processor(s) 536 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 548 can include functionality to train a machine learning model to output classification values. For example, the training component 548 can receive data that represents labelled collision data (e.g. publicly available data, sensor data, and/or a combination thereof). At least a portion of the data can be used as an input to train the machine learning model. Thus, by providing data where the vehicle traverses an environment, the training component 548 can be trained to output occluded value(s) associated with objects and/or occluded region(s), as discussed herein.

In some examples, the training component 548 can include training data that has been generated by a simulator. For example, simulated training data can represent examples where a vehicle collides with an object in an environment or nearly collides with an object in an environment, to provide additional training examples.

The processor(s) 516 of the vehicle 502 and the processor(s) 536 of the computing device(s) 534 may be any suitable processor capable of executing instructions to process data and perform operations as described herein. By way of example and not limitation, the processor(s) 516 and 536 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

FIG. 6 is a flowchart depicting an example process 600 for determining an object representation using one or more example models. Some or all of the process 600 may be performed by one or more components in FIG. 5, as described herein. For example, some or all of process 600 may be performed by the autonomous vehicle 502 comprising the vehicle computing device(s) 504.

At operation 602, the process may include receiving first data associated with an autonomous vehicle in an environment. For example, the computing device(s) 302 can receive data associated with the environment 100 and the scene 118. Additionally, or alternatively, the first data can include sensor data, map data, environmental data, etc. In some examples, the map data may represent fixed features of an environment including but not limited to drivable surfaces, traffic signals, right-of-way information, and the like. In some examples, the first data can represent a top-down view of the environment, one or more feature vectors as a vector representation, etc. determined from the sensor data, map data, environmental data, etc.

At operation 604, the process may include determining, by a machine learned model and based at least in part on the first data, a latent representation of an environment that includes an autonomous vehicle. For example, the operation 604 can include the computing device(s) 302 of FIG. 3 implementing the machine learned model 202 of FIG. 2 and/or the model(s) 306 to output the latent representation of the environment including a vehicle and objects therein. In some examples, the latent representation may represent a behavior (e.g., a state or intent) of one or more objects such as a position, a trajectory, an orientation, etc. associated with a previous time. In some examples, the latent representation can include scene attributes and/or control policy information for use in a simulation. In various examples, the latent representation may represent discrete features of different objects proximate an autonomous vehicle (e.g., discrete features representing a first action of the first object and a second action of the second object, etc.).

At operation 606, the process may include determining, by a model and based at least in part on the first data, a non-latent representation of the environment. For example, the operation 604 can include the computing device(s) 302 implementing the model 204 of FIG. 2 and/or the model(s) 306 (e.g., a non-machine learned model) to output the non-latent representation of the environment including the vehicle 102 and one or more objects. The non-latent representation of the environment can include, in some examples, a real-world representation of a position, orientation, velocity, acceleration, etc. of the vehicle and the object(s) in the environment as well as drivable surfaces, traffic signals, right-of-way information, etc.

At operation 608, the process may include inputting the latent representation and the non-latent representation into a tree structure associated with a vehicle computing device of the autonomous vehicle. For example, the computing device(s) 302 can implement the tree structure component 304 to generate the tree structure 210. The tree structure 210 can be used for performing a simulation and/or for determining an action or trajectory usable to control the autonomous vehicle. In some examples, the tree structure 210 can be associated with a computing device coupled to a vehicle (e.g., the vehicle computing device(s) 504) or a computing device remote from the vehicle (e.g., the computing device(s) 534).

At operation 610, the process may include receiving, based at least in part on the vehicle computing device executing the tree structure, output data representing predicted data associated with the environment and/or the autonomous vehicle. For example, the computing device(s) 302 can receive the output data 108 from the tree structure 210 representing conditions in the environment such as an action by an object, a number of objects, a state of the autonomous vehicle, and/or an action or trajectory (e.g., the vehicle trajectory 110) for the autonomous vehicle. In some examples, the output data can be transmitted to a vehicle computing device for controlling the autonomous vehicle (e.g., the vehicle 102 or the vehicle 502). The predicted state data may comprise, for example, position data, orientation data, heading data, velocity data, speed data, acceleration data, yaw rate data, and/or turning rate data, to name a few.

At operation 612, the process may include causing the autonomous vehicle to be controlled in the environment based at least in part on the output data. For example, the vehicle (e.g., the vehicle 102, the vehicle 502) can use the predicted state data to determine a vehicle trajectory for controlling the autonomous vehicle in the environment at a future time. In some examples, the output data can comprise a trajectory for the vehicle (e.g., vehicle trajectory 110) usable to cause the autonomous vehicle to avoid an intersection with one or more objects in the environment while also following traffic laws, using drivable surface, and so on. Additional details of performing a simulation or controlling a vehicle using one or more outputs from one or more models are discussed throughout the disclosure.

FIG. 6 illustrate an example process in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform operations comprising: receiving first data associated with an autonomous vehicle in an environment; determining, by a machine learned model and based at least in part on the first data, a latent representation of the environment; determining, by a model and based at least in part on the first data, a non-latent representation of the environment; determining, based at least in part on the latent representation, a predicted latent representation of the environment; determining, based at least in part on the non-latent representation, a predicted non-latent representation; determining a first cost associated with the predicted latent representation; determining a second cost associated with the predicted non-latent representation; and causing the autonomous vehicle to be controlled in the environment based at least in part on one or more of the first cost or the second cost.

B: The system of paragraph A, the operations further comprising: generating, using a reinforcement model and based on the latent representation and the non-latent representation, a set of actions, wherein the predicted latent representation and the predicted non-latent representation are based on an action of the set of actions, and wherein the reinforcement model is trained based at least in part on the greater of the first cost or the second cost.

C: The system of paragraph A or B, the operations further comprising: associating the latent representation and the non-latent representation with a root node of a tree structure; and determining, based at least in part on latent representation and the non-latent representation, a set of actions, wherein the predicted latent representation and the predicted non-latent representation are based on an action of the set of actions.

D: The system of any of paragraphs A-C, wherein the machine learned model is trained based at least in part on: inputting the predicted latent representation into a decoder; receiving, from the decoder, a predicted environment; determining, based at least in part on the predicted environment and log data, an accuracy metric; and modifying the machine learned model to optimize the accuracy metric.

E: The system of any of paragraphs A-D, wherein: the machine learned model is a first machine learned model, the latent representation comprises an embedding, determining the predicted latent representation comprises: inputting the embedding into a second machine learned model; and receiving, from the second machine learned model, the predicted latent representation, and determining the predicted non-latent representation comprises performing a deterministic physics-based function on the non-latent representation.

F: One or more non-transitory computer-readable media storing instructions that, when executed, cause one or more processors to perform operations comprising: determining a latent representation of an environment that includes a robotic device; determining a non-latent representation of the environment; determining, based at least in part on the latent representation, a set of proposed actions; determining, based on a first action of the set of proposed actions and the latent representation, a predicted latent representation; determining, based on the first action and the non-latent representation, a predicted non-latent representation; determining a first cost associated with the predicted latent representation; determining a second cost associated with the predicted non-latent representation; and causing the robotic device to be controlled in the environment based at least in part on one or more of the first cost or the second cost.

G: The one or more non-transitory computer-readable media of paragraph F, wherein causing the robotic device to be controlled in the environment based at least in part on one or more of the first cost or the second cost comprises causing the robotic device to be controlled based on the greater of the first cost or the second cost.

H: The one or more non-transitory computer-readable media of paragraph F or G, wherein determining the set of proposed actions comprises inputting the latent representation into a reinforcement learning model and receiving, from the reinforcement learning model, the set of proposed actions.

I: The one or more non-transitory computer-readable media of any of paragraphs F-H, wherein the predicted latent representation is determined by a machine learned model, and the operations further comprising: inputting the predicted latent representation into a decoder; receiving, from the decoder, a predicted environment; determining, based at least in part on the predicted environment and log data, an accuracy metric; and modifying the machine learned model to optimize the accuracy metric.

J: The one or more non-transitory computer-readable media of any of paragraphs F-I, wherein: determining the predicted latent representation comprises: inputting the latent representation into a machine learned model; and receiving, from the machine learned model, the predicted latent representation.

K: The one or more non-transitory computer-readable media of any of paragraphs F-J, wherein determining the predicted non-latent representation comprises performing a deterministic physics-based function on the non-latent representation.

L: The one or more non-transitory computer-readable media of any of paragraphs F-K, the operations further comprising: associating the latent representation and the non-latent representation with a first node of a tree structure; associating the predicted latent representation and the predicted non-latent representation with a second node of the tree structure; performing an optimization of the tree structure to determine an output trajectory; and controlling the robotic device in accordance with the output trajectory.

M: The one or more non-transitory computer-readable media of any of paragraphs F-L, the operations further comprising: performing, based at least in part on an output of a node of a tree structure, a simulation including the robotic device and an object in the environment; and determining, based at least in part on a result of the simulation, a trajectory; and causing the robotic device to be controlled in the environment based at least in part on the trajectory.

N: The one or more non-transitory computer-readable media of any of paragraphs F-M, wherein: the predicted latent representation comprises an object in the environment, and causing the robotic device to be controlled in the environment comprises controlling the robotic device relative to the object.

O: The one or more non-transitory computer-readable media of any of paragraphs F-N, the operations further comprising: exploring multiple actions associated with respective nodes of a tree structure in a tree search, the tree structure comprising a node to represent the predicted latent representation and the predicted non-latent representation; and determining a trajectory for the robotic device based at least in part on the lowest cost associated with the multiple actions, causing the robotic device to be controlled in the environment based at least in part on the trajectory.

P: The one or more non-transitory computer-readable media of any of paragraphs F-O, wherein a machine learned model applies a reinforcement algorithm to determine the set of proposed actions in a tree structure based at least in part on the predicted latent representation and the predicted non-latent representation.

Q: A method comprising: determining a latent representation of an environment that includes a robotic device; determining a non-latent representation of the environment; determining a predicted latent representation of the environment that includes the robotic device; determining a predicted non-latent representation of the environment; determining a first cost associated with the predicted latent representation; determining a second cost associated with the predicted non-latent representation; and causing the robotic device to be controlled in the environment based at least in part on one or more of the first cost or the second cost.

R: The method of paragraph Q, further comprising: generating, using a reinforcement model and based on the latent representation and the non-latent representation, a set of actions, wherein the predicted latent representation and the predicted non-latent representation are based on an action of the set of actions, and wherein the reinforcement model is trained based at least in part on the greater of the first cost or the second cost.

S: The method of paragraph Q or R, further comprising: associating the latent representation and the non-latent representation with a root node of a tree structure; and determining, based at least in part on the latent representation and the non-latent representation, a set of actions, wherein the predicted latent representation and the predicted non-latent representation are based on an action of the set of actions.

T: The method of any of paragraphs Q-S, wherein the predicted latent representation is determined by a machine learned model, the machine learned model being trained based at least in part on: inputting the predicted latent representation into a decoder; receiving, from the decoder, a predicted environment; determining, based at least in part on the predicted environment and log data, an accuracy metric; and modifying the machine learned model to optimize the accuracy metric.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the one or more processors to perform operations comprising:
   receiving first data associated with an autonomous vehicle in an environment;
   determining, by a machine learned model and based at least in part on the first data, a latent representation of the environment, the latent representation representing a latent state in a machine learned space;
   determining, by a model and based at least in part on the first data, a non-latent representation of the environment, the non-latent representation including a physical feature of the environment;
   determining, based at least in part on the latent representation, a predicted latent representation of the environment;
   determining, based at least in part on the non-latent representation, a predicted non-latent representation;
   determining a first cost associated with the predicted latent representation;
   determining a second cost associated with the predicted non-latent representation; and
   causing the autonomous vehicle to be controlled in the environment based at least in part on one or more of the first cost or the second cost.

2. The system of claim 1, the operations further comprising:
   generating, using a reinforcement model and based on the latent representation and the non-latent representation, a set of actions,
   wherein the predicted latent representation and the predicted non-latent representation are based on an action of the set of actions, and
   wherein the reinforcement model is trained based at least in part on the greater of the first cost or the second cost.

3. The system of claim 1, the operations further comprising:
   associating the latent representation and the non-latent representation with a root node of a tree structure; and
   determining, based at least in part on the latent representation and the non-latent representation, a set of actions, wherein the predicted latent representation and the predicted non-latent representation are based on an action of the set of actions.

4. The system of claim 1, wherein the machine learned model is trained based at least in part on:
   inputting the predicted latent representation into a decoder;
   receiving, from the decoder, a predicted environment;
   determining, based at least in part on the predicted environment and log data, an accuracy metric; and
   modifying the machine learned model to optimize the accuracy metric.

5. The system of claim 1, wherein:
   the machine learned model is a first machine learned model,
   the latent representation comprises an embedding,
   determining the predicted latent representation comprises:
   inputting the embedding into a second machine learned model; and
   receiving, from the second machine learned model, the predicted latent representation, and determining the predicted non-latent representation comprises performing a deterministic physics-based function on the non-latent representation.

6. One or more non-transitory computer-readable media storing instructions that, when executed, cause one or more processors to perform operations comprising:

determining a latent representation of an environment that includes a robotic device, the latent representation representing a latent state in a machine learned space;

determining a non-latent representation of the environment, the non-latent representation including a physical feature of the environment;

determining, based at least in part on the latent representation, a set of proposed actions;

determining, based on a first action of the set of proposed actions and the latent representation, a predicted latent representation;

determining, based on the first action and the non-latent representation, a predicted non-latent representation;

determining a first cost associated with the predicted latent representation;

determining a second cost associated with the predicted non-latent representation; and causing the robotic device to be controlled in the environment based at least in part on one or more of the first cost or the second cost.

7. The one or more non-transitory computer-readable media of claim 6, wherein causing the robotic device to be controlled in the environment based at least in part on one or more of the first cost or the second cost comprises causing the robotic device to be controlled based on the greater of the first cost or the second cost.

8. The one or more non-transitory computer-readable media of claim 6, wherein determining the set of proposed actions comprises inputting the latent representation into a reinforcement learning model and receiving, from the reinforcement learning model, the set of proposed actions.

9. The one or more non-transitory computer-readable media of claim 6, wherein the predicted latent representation is determined by a machine learned model, and the operations further comprising:

inputting the predicted latent representation into a decoder;

receiving, from the decoder, a predicted environment;

determining, based at least in part on the predicted environment and log data, an accuracy metric; and modifying the machine learned model to optimize the accuracy metric.

10. The one or more non-transitory computer-readable media of claim 6, wherein:

determining the predicted latent representation comprises:

inputting the latent representation into a machine learned model; and receiving, from the machine learned model, the predicted latent representation.

11. The one or more non-transitory computer-readable media of claim 6, wherein determining the predicted non-latent representation comprises performing a deterministic physics-based function on the non-latent representation.

12. The one or more non-transitory computer-readable media of claim 6, the operations further comprising:

associating the latent representation and the non-latent representation with a first node of a tree structure;

associating the predicted latent representation and the predicted non-latent representation with a second node of the tree structure;

performing an optimization of the tree structure to determine an output trajectory; and controlling the robotic device in accordance with the output trajectory.

13. The one or more non-transitory computer-readable media of claim 6, the operations further comprising:

performing, based at least in part on an output of a node of a tree structure, a simulation including the robotic device and an object in the environment; and determining, based at least in part on a result of the simulation, a trajectory; and causing the robotic device to be controlled in the environment based at least in part on the trajectory.

14. The one or more non-transitory computer-readable media of claim 6, wherein:

the predicted latent representation comprises an object in the environment, and causing the robotic device to be controlled in the environment comprises controlling the robotic device relative to the object.

15. The one or more non-transitory computer-readable media of claim 6, the operations further comprising:

exploring multiple actions associated with respective nodes of a tree structure in a tree search, the tree structure comprising a node to represent the predicted latent representation and the predicted non-latent representation; and determining a trajectory for the robotic device based at least in part on the lowest cost associated with the multiple actions, causing the robotic device to be controlled in the environment based at least in part on the trajectory.

16. The one or more non-transitory computer-readable media of claim 6, wherein a machine learned model applies a reinforcement algorithm to determine the set of proposed actions in a tree structure based at least in part on the predicted latent representation and the predicted non-latent representation.

17. A method comprising:

determining a latent representation of an environment that includes a robotic device, the latent representation representing a latent state in a machine learned space;

determining a non-latent representation of the environment, the non-latent representation including a physical feature of the environment;

determining a predicted latent representation of the environment that includes the robotic device;

determining a predicted non-latent representation of the environment;

determining a first cost associated with the predicted latent representation;

determining a second cost associated with the predicted non-latent representation; and causing the robotic device to be controlled in the environment based at least in part on one or more of the first cost or the second cost.

18. The method of claim 17, further comprising:

generating, using a reinforcement model and based on the latent representation and the non-latent representation, a set of actions, wherein the predicted latent representation and the predicted non-latent representation are based on an action of the set of actions, and wherein the reinforcement model is trained based at least in part on the greater of the first cost or the second cost.

19. The method of claim 17, further comprising:

associating the latent representation and the non-latent representation with a root node of a tree structure; and determining, based at least in part on the latent representation and the non-latent representation, a set of actions, wherein the predicted latent representation and the predicted non-latent representation are based on an action of the set of actions.

20. The method of claim 17, wherein the predicted latent representation is determined by a machine learned model, the machine learned model being trained based at least in part on:

inputting the predicted latent representation into a decoder;

receiving, from the decoder, a predicted environment;

determining, based at least in part on the predicted environment and log data, an accuracy metric; and modifying the machine learned model to optimize the accuracy metric.

\* \* \* \* \*